United States Patent
Bergqvist et al.

(10) Patent No.: US 7,154,056 B2
(45) Date of Patent: Dec. 26, 2006

(54) METHOD AND ARRANGEMENT IN A DIGITAL COMMUNICATION SYSTEM

(75) Inventors: Eva Bergqvist, Stockholm (SE); Linus Wiebe, Lund (SE)

(73) Assignee: Anoto AB, Lund (SE)

( * ) Notice: Subject to any disclaimer, the term of this patent is extended or adjusted under 35 U.S.C. 154(b) by 487 days.

(21) Appl. No.: 10/178,761

(22) Filed: Jun. 25, 2002

(65) Prior Publication Data

US 2003/0011578 A1    Jan. 16, 2003

Related U.S. Application Data

(60) Provisional application No. 60/314,176, filed on Aug. 23, 2001.

(30) Foreign Application Priority Data

Jun. 25, 2001  (SE) .................................... 0102232

(51) Int. Cl.
*G06K 11/06*  (2006.01)

(52) U.S. Cl. .................. 178/18.01; 345/961; 345/963; 345/966; 345/970; 345/156; 178/19.05

(58) Field of Classification Search .. 178/18.01–18.03, 178/18.05, 19.01–19.05, 18.09; 345/156, 345/166, 179, 961–963, 966–970; 235/472.01, 235/472.02, 468, 462.1, 462.2, 462.3, 487, 235/494–495, 461.1; 455/422.1, 556.1–556.2, 455/557; 702/56, 183

See application file for complete search history.

(56) References Cited

U.S. PATENT DOCUMENTS

| | | | |
|---|---|---|---|
| 5,012,049 A | 4/1991 | Schier | |
| 5,294,792 A | 3/1994 | Lewis et al. | |
| 5,434,371 A | 7/1995 | Brooks | |
| 5,561,446 A * | 10/1996 | Montlick | 345/173 |
| 5,852,434 A | 12/1998 | Sekendur | |
| 6,058,304 A | 5/2000 | Callaghan et al. | |
| 6,076,734 A | 6/2000 | Dougherty et al. | |
| 6,104,388 A | 8/2000 | Nagai et al. | |
| 6,112,024 A * | 8/2000 | Almond et al. | 717/122 |
| 6,130,666 A | 10/2000 | Persidsky | |
| 6,311,042 B1 * | 10/2001 | DeSchrijver | 455/66.1 |
| 6,724,374 B1 * | 4/2004 | Lapstun et al. | 345/179 |

(Continued)

FOREIGN PATENT DOCUMENTS

SE    9904746-6    12/1999

(Continued)

*Primary Examiner*—Richard Hjerpe
*Assistant Examiner*—Leonid Shapiro
(74) *Attorney, Agent, or Firm*—Birch, Stewart, Kolasch & Birch, LLP

(57) ABSTRACT

A user of a digital pen in an information management system is allowed to have a number of aliases when communicating in the system. The system includes a plurality of products, which are provided with a position code, a plurality of digital pens capable of reading the position code, and a server communicating with said digital pens. The server includes a position database which associates positions coded by the position code with rules for information management. A pen identifier is associated with a digital pen and at least one alias is associated with the pen identifier, the alias being indicative of a role of a pen user when the user communicates via the digital pen in the information management system. The alias information is communicated to the system, e.g., when the digital pen is operated to mark an activation icon on a product, which includes position codes whose associated rules manage the association between alias and pen identifier.

42 Claims, 3 Drawing Sheets

U.S. PATENT DOCUMENTS

| | | |
|---|---|---|
| 2002/0088001 A1* | 7/2002 | Zustak et al. ............... 725/109 |
| 2002/0095571 A1* | 7/2002 | Bradee ....................... 713/164 |
| 2002/0107885 A1* | 8/2002 | Brooks et al. .............. 707/505 |
| 2004/0073566 A1* | 4/2004 | Trivedi ....................... 707/102 |
| 2004/0083174 A1* | 4/2004 | Silverbrook et al. .......... 705/42 |
| 2004/0204236 A1* | 10/2004 | Lapstun et al. ............... 463/29 |

FOREIGN PATENT DOCUMENTS

| | | |
|---|---|---|
| WO | WO 98/20446 A1 | 5/1998 |
| WO | WO 99/17230 | 4/1999 |
| WO | WO 00/00928 | 1/2000 |
| WO | WO 00/72244 A1 | 11/2000 |
| WO | WO 00/72503 A1 | 11/2000 |
| WO | WO 00/73983 A1 | 12/2000 |
| WO | WO 01/16691 A1 | 3/2001 |
| WO | WO 01/48591 A1 | 7/2001 |
| WO | WO 01/48592 A1 | 7/2001 |
| WO | WO 01/48678 A1 | 7/2001 |
| WO | WO 01/48685 A1 | 7/2001 |
| WO | WO 02/075629 A1 | 9/2002 |

* cited by examiner

METHOD AND ARRANGEMENT IN A DIGITAL COMMUNICATION SYSTEM

RELATED APPLICATION DATA

This application is related to and claims priority under 35 U.S.C. § 119 to U.S. Provisional Application No. 60/314,176, filed Aug. 23, 2001, entitled "Method and Arrangement in a Digital Communication System", which is expressly incorporated herein by reference in its entirety. This application is also related and claims priority to Swedish Application No. 0102232-6 filed Jun. 25, 2001, entitled "Method and Arrangement in a Digital Communication System", which is also expressly incorporated herein by reference in its entirety.

TECHNICAL FIELD

The present invention relates to the field of digital communication, and more specifically to an infrastructure for management and communication of information which is registered with a digital pen.

BACKGROUND

Traditionally, information is written and distributed by means of pen and paper. However, such paper-based information is difficult to manage and communicate in an efficient way.

Computers are, to an ever-increasing extent, used for management and communication of information. The information is typically input by means of a keyboard and stored in the computer memory, for example, on a hard disk. However, it is a slow process to input information with a keyboard, and there is a significant risk of errors occurring in the process. Graphic information, such as drawings and images, is normally fed to the computer through a separate device, such as a scanner or the like. The process of feeding such information to the computer is time-consuming, lengthy, and often yields unsatisfactory results. When the information eventually is located in the computer, it can easily be communicated to others, for example, as an e-mail or SMS via an Internet connection, or as a fax via a fax modem.

The present Applicant has proposed a remedy to this problem in the international application WO 01/16691, which is incorporated herein by reference and in which the Applicant envisages the use of a product having a writing surface which is provided with a position code. The position code, which codes a plurality of positions on the surface, enables electronic recording of information that is being written on the writing surface, by means of a digital pen which detects the position code. The product also has one or more activation icons which, when detected by the digital pen, cause the pen to initiate a respective predetermined operation which utilizes the information recorded by the pen.

More specifically, the position-coded product has a built-in functionality, in that different positions on the product, such as positions within the activation icon and positions within the writing surface, are dedicated for different functions. Furthermore, the position code is capable of coding coordinates of a large number of positions, much larger than the number of necessary positions on the product. Thus, the position code can be seen as forming a virtual surface which is defined by all positions that the position code is capable of coding, where different positions in the virtual surface are dedicated to different functions and/or actors.

The above-concept can be used for a number of different purposes. The combination of pen and position-coded product can be used as an input device to a computer, a PDA (Personal Digital Assistant), a mobile phone or the like. For example, text and sketches written on a position-coded notepad can be transferred via the pen to a computer. Additionally, the combination of pen and position-coded product allows for global communication, directly from the product via the pen, by the position code on the product being dedicated for such communication. For example, the information registered by the pen can be transformed to a fax message, an e-mail or an SMS (Short Message Service), and then sent from the pen to a recipient. Further, the combination of pen and position-coded product can be used in e-commerce. For example, the digital pen can be used to order an item from a position-coded advertisement in a magazine, by the position code in the advertisement being dedicated for such a service.

The above concept has been implemented in a system or infrastructure, which is shown in FIG. 1 and which is further disclosed in Applicant's international patent applications WO 01/48678 (U.S. Patent Application Publication No. US 2003/0046256), WO 01/48591 (U.S. Patent Application Publication No. US 2002/0091711), and WO 01/48685 (U.S. Patent Application Publication No. US 2003/0061188) which are incorporated herein by reference.

The system of FIG. 1 comprises a plurality of digital pens DP, a plurality of products P with a position code PC, a look-up unit ALS (Application Lock-up Server), and a plurality of service handler units SH. The look-up unit ALS comprises one or more servers which communicate with a database containing the virtual surface and information related thereto, i.e., the functionality of every position in the virtual surface and the actor associated with each such position. The service handler unit SH is a server unit effecting a service, such as storing or relaying digital information, or initiating transmission of information or items to a recipient.

When the digital pen DP is operated to mark an activation icon AI on the position-coded product P, the pen DP initiates an operation to forward a message to the look-up unit (step 1), for example, via short-range radio transmission to a mobile phone MP acting as a modem for connection to the look-up unit ALS. The message contains a unique pen identifier and at least one position from the digital information that has been recorded electronically on the writing surface of the product P.

Based on the position content of the message, the look-up unit ALS instructs the digital pen DP to contact a specific service handler unit SH (step 2). The pen DP then sends the message to the service handler unit SH (step 3), which instructs the pen DP on what data to send, and how to format and tag that data (step 4). After having received the requested data from the pen DP (step 5), the service handler unit SH returns a verification thereof to the pen DP (step 6).

The information management system of FIG. 1 involves many dependent actors: companies manufacturing the digital pens ("pen manufacturers"), companies manufacturing the position-coded products ("paper manufacturers"), companies providing different services by means of the service handler units ("service handlers"), a company administrating the position-code based on the virtual surface database ("pattern administrator"), operators providing the communication link between the digital pens and the different units ("network operators"), and a multitude of users of digital pens ("pen owners").

A prior art user device in a message information system is described in the international patent application WO 9917230. The prior art user device performs a function of reading bar coded information from magazines, advertisements, etc. and sending a request to a database system for further information relating to the bar coded information to be supplied to an information receiving address. One or more information receiving addresses can, by user selection, be associated with the prior art user device, thus enabling several users to use the device and to have the further information to be sent to a specific address for each user.

SUMMARY OF THE INVENTION

In accordance with the principles of the invention, as embodied and broadly described herein, methods and systems consistent with the principles of the invention provide for handling information in an information management system. The system includes at least one digital pen capable of reading information and communicating at least part thereof in at least one communication network. Each at least one digital pen is associated with a respective pen identifier. The system and method include associating an alias with a pen identifier in dependence on information that is registered on a product in the form of at least one position code which is coded by a position code, the alias being indicative of a role of a pen user when the user communicates via a digital pen in the information management system.

According to principles consistent with the present invention, information is handled in an information management system. The system includes at least one digital pen capable of reading information which is preferably present on a surface of a product. The information is at least partly communicated between the pens and actors in a communication network. A pen identifier is associated with each digital pen and at least one alias is associated with the pen identifier, where the alias is indicative of a role of a pen user when the user communicates via the pen in the information management system.

In an exemplary embodiment, the information which is read from a surface of a product includes positions encoded as a position code. A position code database present in the information management system associates positions coded by the position code with rules for information management. The digital pens are hence arranged to communicate with the system at at least one position which is coded by the position code. Rules governing the interpretation of such position code then associate a pen identifier with at least one alias.

In other words, alias information is communicated to the system, e.g., when the digital pen is operated to mark an activation icon on a product which includes a position code that has associated rules for management of the association between alias and pen identifier.

It shall be noted that the association of at least one alias with a pen identifier may be performed without making use of a position code. The rules for information management which performs, or at least initiates, the association of alias with pen identifier may of course act on other types of information read from a product. Such information may include text or any other symbol set which can be present on a surface and be readable by a reading device such as a digital pen. However, in one exemplary embodiment of the invention, the association of an alias with a pen identifier is performed in dependence of at least one position which is coded by a position code.

One advantage of the present invention is hence that a user of a pen is allowed to have a number of aliases when communicating with an information management system.

A plurality of aliases can be associated with the pen identifier, each alias being indicative of a different role of a pen user when the user communicates via the digital pen in the information management system. For example, the user may have a first alias when performing actions as a private person, a second alias when he acts as an employee of a company, a third alias when he acts in the interest of his golf club, etc. Using one or more aliases may thus be regarded both as a convenient way of providing, e.g., service providers with selected personal data relating to the role of the user, as well as a way of securing privacy when interacting with a particular service handler.

Another advantage of the present invention is that it allows for a more flexible and versatile use of a digital pen, which communicates in an information management system. The user may use one single pen device when acting in different roles during interaction with different service handlers. This is in contrast to state-of-the-art devices that are only capable of being used in more or less "single user mode", i.e., the relationship between a user of a state-of-the-art device is always characterized by a one-to-one correspondence.

Moreover, another feature of the present invention provides for a plurality of aliases that can be associated with the pen identifier, where each alias may be indicative of a role of different pen users when the users communicate via the digital pen in the information management system. For example, a digital pen may be present at a shop, post office, or any other point of service where users may borrow the pen to perform actions in an information management system. In fact, any pen owner may lend his/her pen to a borrower who may use the pen temporarily, acting with an alias when communicating with the system.

Another advantage of the present invention is that users who elect not to own a digital pen may still be able to use such a pen when necessary and be able to identify himself with the system by way of his alias.

Furthermore, it is possible to associate a role profile with the at least one alias, the role profile including data to be at least partly communicated with actors in the information management system. For example, the user may, when acting with an alias corresponding to his role as an employee of a company, communicate data regarding his office address, telephone number, etc. This data may be present in an alias profile as well as other, more complex data such as text and graphics entered via the digital pen.

By having several aliases and corresponding alias profiles, the user may, for example, separate the data pertaining to himself as an employee of a company from the data pertaining to him as a private person. This is advantageous in that the user may select an appropriate alias with associated profile data when performing actions, i.e., communicating with different actors in the information management system, disclosing only data intended for each actor.

A user may switch from one alias to another by explicitly selecting an alias as will be discussed below. However, switching from one alias to another may also involve a more or less automatic procedure, performed by the processing means of the pen or the system, where a preset time may trigger a switch from a first to a second alias. Another automatic procedure is to regard a specific alias as a "default alias" which is selected every time a pen is activated after being inactive for a certain period of time.

Data regarding an alias and data in an alias profile may be provided by a user and stored in the information management system. The provision of user input may include receiving data via the pen as well as via an interface unit, which is arranged for connection to a host unit providing a site on a public network, e.g., a web portal.

Moreover, data relating to an alias and a profile may be provided to a user, through, e.g., a data feed-back feature. This may be achieved by way of, e.g., an interface unit which is arranged for connection to a host unit providing a site on a public network. Such an interface unit may of course be one and the same as that used for user input of alias and profile data, e.g., a web portal. Data may also be fed back to the user via the pen which may be equipped with a small display unit in the form of, e.g., a LED, LCD or similar connected to the processing means of the pen. Feedback data may also be presented to a user by way of a mobile communication terminal, such as a telephone, which may form part of the communication path between the pen and the system, as will be illustrated below.

As stated above, data regarding an alias and data in an alias profile may be stored in the information management system. Alternatively, the data and profile is of an alias are stored on a server which can be accessed by the information management system and/or the digital pen over a network, such as the Internet. It is also envisaged that the data and profile of an alias may be stored by the digital pen itself. As will be understood the data and profile of an alias may also be stored on a data carrier, such as on a diskette, smart card, SIM (Subscriber Identity Module) card, and the like. Via a suitable operative connection the alias data and alias profile stored on the data carrier may then either be transferred to the digital pen or the information management system, or be used directly to control service operations that depend on the alias data or profile.

According to another feature of the present invention, a product is provided for use in an information management system. The system includes at least one digital pen being identified by a respective pen identifier and capable of reading information from the product and communicate at least part of the information in at least one communication network. The information registered on the product includes information which, when processed in the system, enables association of at least one alias with the pen identifier, where the alias is indicative of a role of a pen user when the user communicates via the digital pen in the information management system.

In an exemplary embodiment, the information, which may be present on a surface of a product includes positions encoded as a position code. A position code database present in the information management system associates positions coded by the position code with rules for information management. The governing rules interpret such position code then associate a pen identifier with at least one alias.

Examples of such products include small printed cards, readily available and are used, for example, for applying onto surfaces of a wallet, mobile telephone, etc. The alias information applied on the product may be communicated to the system, e.g., when the digital pen is operated to mark an activation icon. Such an activation icon may include a position code whose associated rules manage the association between alias and pen identifier.

Furthermore, the product may include information which, when processed by the system enables association of a plurality of aliases with the pen identifier, each alias being indicative of a different role of a pen user when the user communicates via the digital pen in the information management system. For example, a user may obtain information from a product and communicate the information to the system which enables him to have a first alias when performing actions as a private person, a second alias when he acts as an employee of a company, a third alias when he acts in the interest of his golf club, etc.

Moreover, the product may include information which, when processed by the system enables a plurality of aliases to be associated with the pen identifier, each alias being indicative of a role of different pen users when the users communicates via the digital pen in the information management system. For example, a user may obtain information from a product using a digital pen present at a shop, post office or any other point of service where users may borrow the pen to perform actions in an information management system. Such a product may be in the form of a one-time-alias card, which the user buys from a point of service such as a shop, and, which he may use to input an alias and possibly also other written information to the system.

The product may also include information relating to a role profile which may be associated with an alias. The data in the profile may be at least partly communicated with actors in the information management system. For example, a user may obtain information from a product and communicate the information to the system which, when pertaining to an alias corresponding to his role as an employee of a company, communicates data regarding his office address, telephone number, etc. Such data may be present in an alias profile as well as other, more complex data such as text and graphics entered onto the product via the digital pen. Products having such alias and profile information applied may include pages of calendars and notebooks as well as dedicated alias profile input sheets.

A product may also include a position code whose associated rules enable information relating to an alias to be provided to a user, i.e., a feed-back feature. The presentation of the alias may be by way of, e.g., an interface unit which may be arranged for connection to a host unit providing a site on a public network, or via the pen or a mobile communication terminal as discussed above.

Further scope of applicability of the present invention will become apparent from the detailed description provided hereinafter. It should be noted, however, that the detailed description and specific examples while indicating the different embodiments of the invention, is given by way of illustration only, since various changes, alterations and modifications coming within the spirit and scope of the invention will become apparent to those skilled in the art from this detailed description.

BRIEF DESCRIPTION OF THE DRAWINGS

Further aspects, features, and advantages of the invention will become apparent from the detailed description given below with reference to the accompanying drawings, which are incorporated in and constitute a part of the specification and, together with the description, explain the features and principles of the invention. In the drawings.

DETAILED DESCRIPTION

Figure 2:
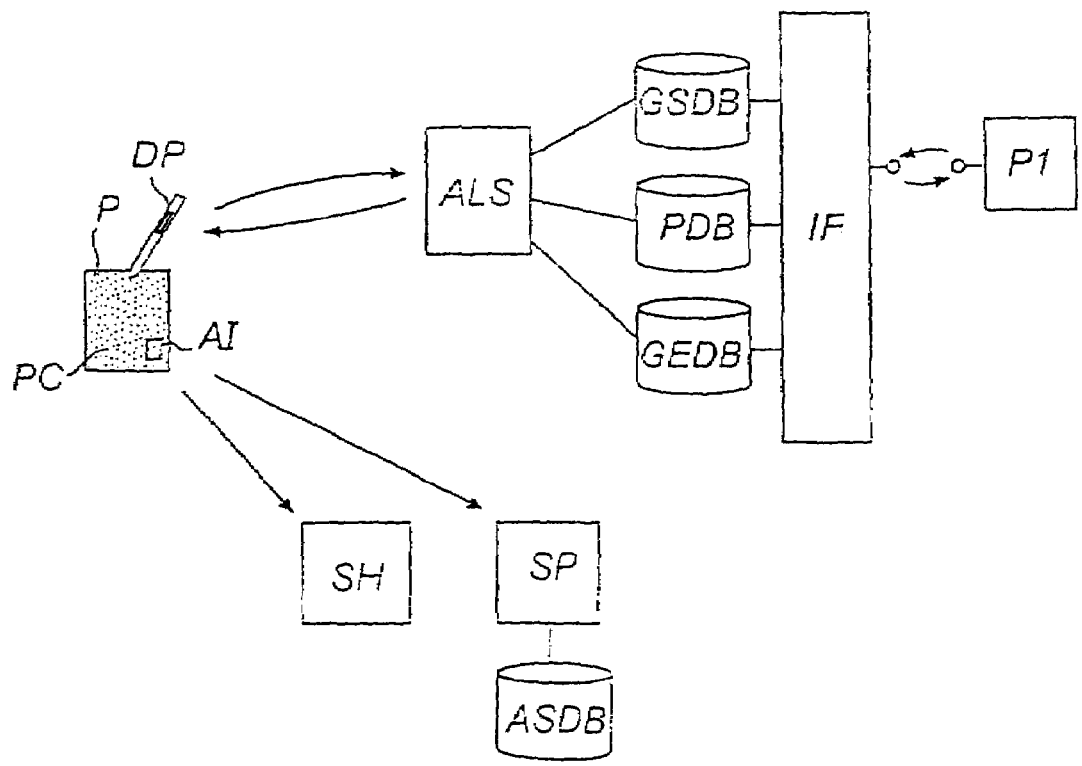
FIG. 2 depicts an exemplary system for management and communication of information consistent with the principles of the present invention.

The detailed description will commence, while referring to FIG. 2, with a description of an exemplary system in which the present invention may be implemented. Exemplary embodiments of inventive products will then be described with reference to FIGS. 3–5.

The exemplary system of FIG. 2 includes a multitude of digital pens DP and position-coded products P (only one of each shown in FIG. 2), a look-up unit ALS, and a plurality of service handler units SH (only one shown in FIG. 2). The configuration and interrelation of the different parts of the system, as well as the communication of information between these parts, have already been described above and will therefore not be repeated here.

Figure 1:
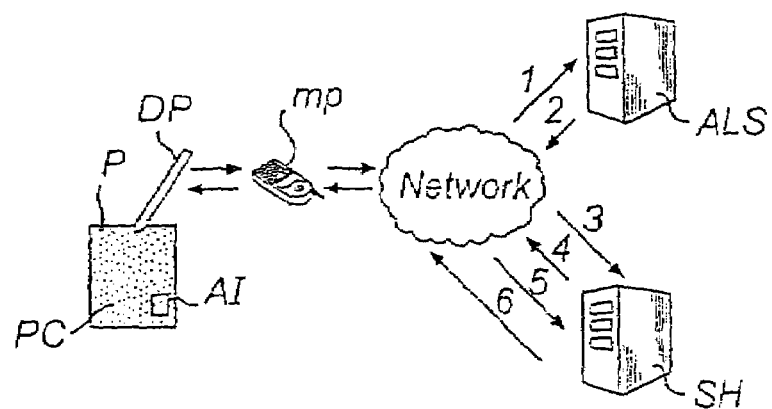
FIG. 1 depicts an exemplary system for management and communication of information.

It should be noted, however, that the information can be transmitted in any suitable way from the digital pen DP to the look-up unit ALS and the service handler units SH. In one exemplary embodiment, wireless transmission of information may be effected from the digital pen DP to a network connection unit, which in turn transmits the information to the look-up unit ALS and service handler units SH, respectively. The network connection unit may be the mobile phone MP shown in FIG. 1, a PDA, a computer or any other suitable unit with an interface to a computer network such as the Internet or a local area network (LAN). Alternatively, the network connection unit can be an integral part of the digital pen DP.

The look-up unit ALS may be connected to a virtual surface database GSDB (Global Space DataBase) which includes data on the functionality of every position coded by the position code PC and the actor associated with each such position. In other words, the look-up unit ALS, by using information stored in the virtual surface database, associates positions coded by the position code with rules for information management.

The look-up unit ALS may be also connected to a pen database PDB, which includes data on all digital pens in the system, such as the unique pen identifier of each pen and all settings or properties that are associated with each pen, such as the alias information. The pen database PDB also includes data on the manufacturer of each pen.

The alias information includes, in a first embodiment, any number of alias identifiers stored as rules for information management in the look-up unit ALS, the GSDB and/or the pen database PDB. That is, position codes with associated rules which, when used in connection with information stored in the pen database, directs the look-up unit ALS to associate an alias with a specific pen identifier. Control regarding how many aliases, and which aliases, that may be associated with a specific pen identifier may be, e.g., performed by way of user subscriptions. These subscriptions allow users to perform actions in the system with respect to the pen identifiers within the system. Such a subscription service will allow different levels of alias services, each of which may include different number of aliases available to the subscriber. A high level subscription may include a large number of aliases intended for subscribers who perform a large number of functions in many different roles. A more basic level subscription may include only a couple of aliases, one associating a private profile and the other associating a work profile with the pen identifier.

An alternative embodiment provides that the alias, or aliases, may be unconnected with any specific pen identifier. Such an embodiment allows for public use of digital pens located at specific points of service such as shops, libraries, post offices, banks, etc. The alias will, in such an embodiment, act as a temporary user identity which a user, or rather a potential user, obtains by, e.g., purchasing a product such as a small card or token having printed thereupon a position coding pattern which, when processed by the look-up unit ALS, associates the temporary user with the pen identifier of the digital pen in use.

Naturally, each alias to be used by a user, either as a subscriber or a temporary user, may be associated with supplementary data regarding the user of the alias and his preferences when performing actions under each specific alias. This is not least important when considering the exemplary embodiment of the alias as a temporary user identity. The user may want to utilize different public digital pens at different occasions. Depending on the specific service location at which the public digital pen is located and also the intended use of the pen, the supplementary data may include user data such as address, telephone number, credit card number, etc.

Returning now to FIG. 2, the look-up unit ALS may be connected to an event database GEDB, which includes data on the transactions taking place in the look-up unit ALS, i.e., the address requests made by the pens in the system and the address responses returned to the pens, as well as any errors occurring in the process. As an alternative to individual databases as shown in FIG. 2, the look-up unit ALS could instead be connected to one all-embracing database.

The system also includes one or more networks in which network operators handle the communication between the digital pens DP and the look-up unit ALS, and between the digital pens DP and the service handler units SH. To this end, the owner of a pen has opened a subscription at one of the network operators. This network operator could also act as a service handler in the system, for example, by means of a server unit SP providing communication services that allows the pen owner to send electronic messages, for example, e-mail, SMS or fax, based on information written on the position-coded products P by means of the digital pen DP. The server unit SP of the network operator could also provide for network storage of information generated in the system, for example, entries in an position-coded calendar or notebook. When acting as a service handler, the network operator maintains an application database ASDB which contains data on user-specific settings for different applications, for example, a signature or electronic business card to be attached to e-mail messages, where and how to store sent messages, etc.

The actors in the system disclosed in FIG. 2 include pen owners, pen manufacturers, paper manufacturers, service handlers, network operators, and a pattern administrator.

In the embodiment of FIG. 2, the system includes an Internet portal P1 hosted by one or more web servers which are interfaced to the databases of the system. The portal P1 may be a Pen Owner Portal, i.e., a portal which allows the pen owners to access selected portions of the databases in the system. Such access includes means for the user to change and view alias data.

The Internet portal P1 may be implemented on one or more Internet-connected servers providing a user interface to the actors via the Internet. It should be noted, however, that Internet may be representative of an exemplary use of the present invention, but should not be considered limiting, as the invention may apply in other networks and combinations of networks. The actors in the system may access the portal P1 by means of a web browser on any suitable device, such as a personal computer, a PDA, a mobile phone, etc.

By means of the interface unit IF, via the portal P1, pen owners are able to view, change, and/or add settings related to their digital pen as well as their alias profiles as will be discussed further below. These settings are stored in the pen database PDB.

The settings in the pen database PDB can include personal data such as name, postal address, delivery address, e-mail address, home phone number, mobile phone number, home fax number, business fax number, business phone number, credit card number, etc. The settings in the pen database PDB can also relate to feedback, for example, to what extent the pen user should be prompted for confirmation before anything is sent from the pen. It may also be conceivable to let the pen owner set up a filter that specifies the personal data that can be requested by different service handler units SH. Further, the user-controllable settings in the pen database PDB can relate to the operation of the pen, for example, the degree of data compression in the pen, the maximum residence time in the pen for registered information, any pen-specific PIN code used in authentication of the pen, etc. The data in the application database ASDB can, for example, relate to a personal signature or an electronic business card to be attached to e-mail messages, a customized layout of fax massages, where and how to store sent messages, a default cc address for e-mail messages, etc. In case the pen owner has more than one pen, he may be able to use an import/export function to copy settings between his different pen entries in the pen database.

One advantage of the system shown in FIG. 2 is that the pen owner may be able to store, add and change personal data in the system, including adding and changing the alias related data. Instead of requiring the pen owner to enter personal data each time he uses the combination of pen and a position-coded product, for example, to write personal data in dedicated OCR fields on the product or to provide personal data in interaction with the network connection unit (MP in FIG. 1), personal data can be supplied within the system to the service handler unit SH, either automatically or on demand. This allows for an intuitive and streamlined use of the digital pen, in that the digital pen can be used like a regular pen, with the functionality being embedded in the position-coded product surface. Further, the risk of typing/recognition errors may be minimized by the use of predetermined settings in the system.

The provision of an interface unit IF allows a pen owner to access the pen database PDB via a public web site, such as the Internet portal discussed above. For example, by integrating a browser (WAP, i-mode etc) in the mobile phone or PDA that connects the pen to the network, the pen owner may be given the possibility to change his pen settings at any time.

A detailed description of a system including such a portal P1 is to be found in applicants' international application PCT/SE02/00548 (U.S. Patent Application No. US 2002/0138568), which is incorporated herein by reference.

Figures 3, 4A:
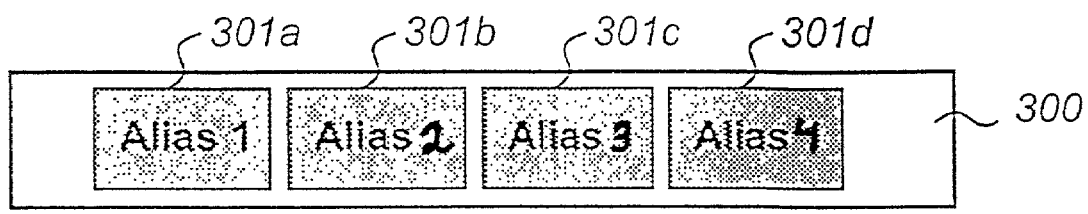
FIG. 3 depicts an exemplary product consistent with the principles of the present invention.
FIGS. 4a and 4b depict alternative exemplary products consistent with the principles of the present invention.

Referring now to FIG. 3, a product in the form of a simple card 300 may be provided with a number of alias activation icons 301a, 301b, 301c, 301d having a position coding pattern which when processed by the look-up unit allow association of an alias with the pen identifier of the pen in use. The activation icons 301 are in the example of FIG. 3 denoted simply by Alias1, Alias2, Alias3, etc. One of ordinary skill in the art can appreciate additional uses for denotations, for example, describing additional denotations regarding an intended role the user may adopt when performing actions with the digital pen. The card 300 may be supplied to a user, or subscriber, of an alias service and be in a physical format which allows for easy access, e.g., as a sticker for applying to a mobile phone, PDA, calendar, etc.

FIG. 4 illustrates a combined registration form and logging form. A sheet 400 suitably designed for keeping in a personal paper calendar (not shown) includes a registration area 401 and a logging area 402. The registration area 401 includes a position coded area 403 onto which a pen user writes profile information. Here, the profile information to be input may be exemplified with basic textual information such as name, address, company name, credit card number, etc. The text written by the user in the position coded area 403 may be interpreted by way of ICR/OCR functions known in the art and stored in the pen database PDB (see FIG. 2). The ICR/OCR processing may be performed in whole or in part in the processing means of the ALS and the processing means of the digital pen. The position coded area 403 includes position codes having associated rules for processing which perform the function of associating the written and interpreted information as associated with a first alias denoted by "Alias 1" 406. The registration area 401 hence acts both as a means for registering information, i.e., alias profile information, associated with the alias as well as acting as a written record of the alias profile.

Figure 4B:
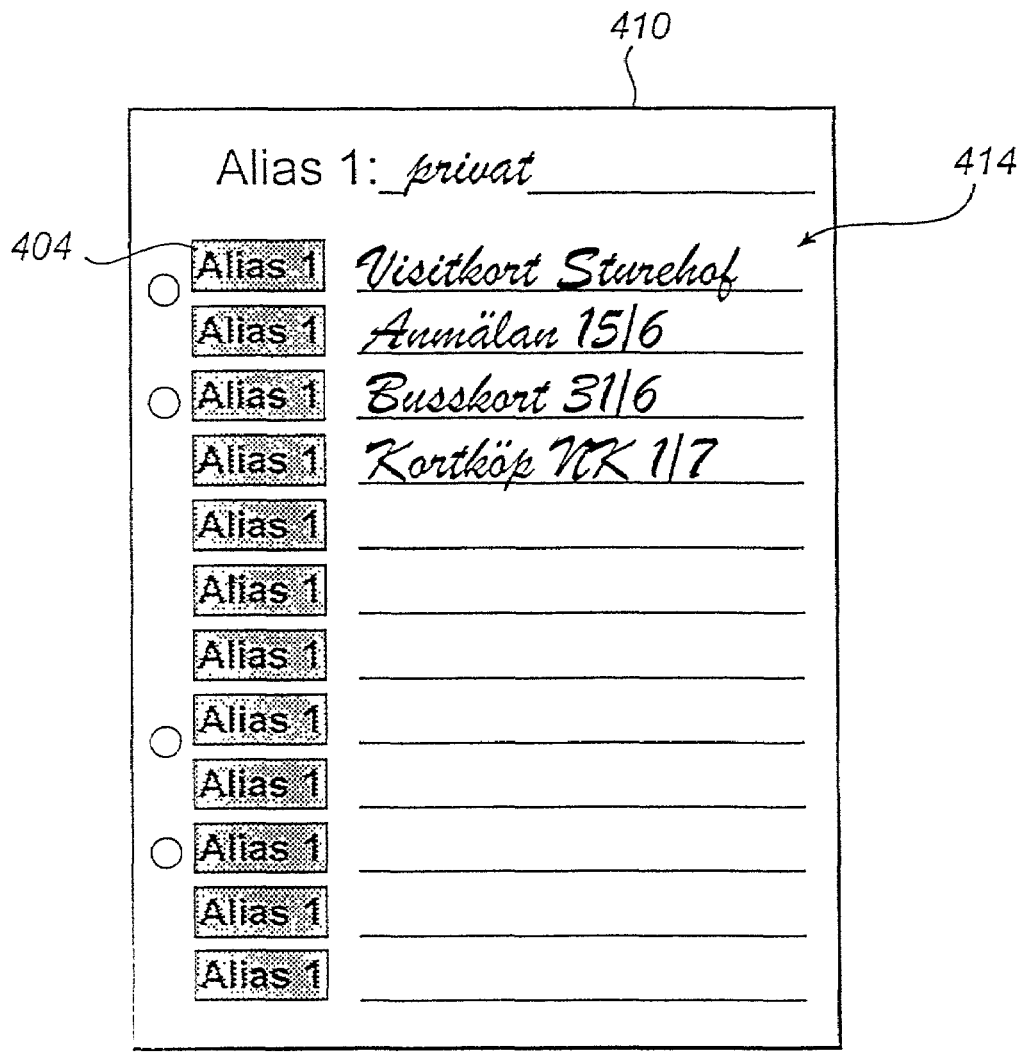

The logging area 402 includes a number of activation icons 404 having position codes associated with the first alias "Alias 1" 401. When read by the digital pen, the position code may be processed by the look-up unit, as discussed above, and the first alias may be associated with the pen identifier. Adjoining each activation icon 404 are spaces 405 for written notation of any information which the user of the pen may find informative regarding the actions he performs during a period of acting in the role of "Alias 1". As FIG. 4b shows, separate additional sheets 410 may include a further logging area 414, a number of activation icons 404.

Figure 5:
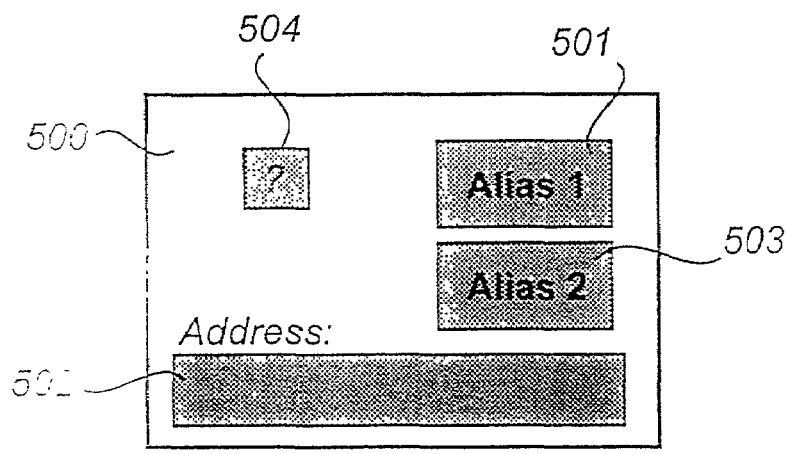
FIG. 5 depicts an alternative exemplary product consistent with the principles of the present invention.

Turning now to FIG. 5, an exemplary product is illustrated in the form of a card 500 which can be provided to users who do not possess a digital pen, but need to utilize public digital pens at a shop or a bank, etc., as discussed above. The card 500 includes, as in the previous example discussed above in connection with FIGS. 4a and 4b, position coded areas in the form of alias activation icons 501,503 and a second position coded area 502. The alias activation icons 501,503 provide the associating function as discussed above and the second position coded area 502 provides an area for inputting any information, such as an address, credit card number, etc., which may be provided to a service handler unit (SH in FIG. 2) when the user performs actions with a digital pen.

The product 500 further includes a feedback activation icon 504 having position codes that, when interpreted by the system, activates a feedback function which provides the user with information regarding, e.g., the presently selected alias. This may be achieved by way of, e.g., an interface unit which may be arranged for connection to a host unit providing a site on a public network. Such an interface unit may of course be one and the same as that used for user input of alias and profile data, e.g., a web portal as illustrated above in connection with FIG. 2. Data may also be fed back to the user via the pen which may be equipped with a small display unit in the form of, e.g., a LED, LCD or similar connected to the processing means of the pen. Feedback data may also be presented to a user by way of a mobile communication terminal, such as a telephone, which forms part of the communication path between the pen and the system, as illustrated above in connection with FIG. 1.

In the above discussion regarding the processing of position codes and association of profiles to pen identifiers and users, a number of calculations take place. These calculations are performed in processing means, such as a processor in the look-up unit ALS. The software which performs the calculations may be written in accordance with the description and it is assumed that the person skilled in the art will choose suitable tools for performing such programming. The software may be present, or stored, in any form known in the art, such as any volatile or non-volatile memory units capable of being connected to the processor and be readable by the processor, such as a diskette or a CD-ROM, as well as propagated signals such as the stream of bits that represent Internet transmission of packets or the carrier waves that are transmitted to satellites.

Moreover, although the exemplary embodiment described above includes a digital pen capable of reading a position code, it is also feasible to make use of other reading devices that are capable of determining its position. For example, different kinds of sensors may be arranged in the pen for determining its position, e.g., acceleration sensors, as described in U.S. Pat. No. 5,434,371 and U.S. Pat. No. 6,130,666, optical sensors, as described in U.S. Pat. No. 5,294,792, U.S. Pat. No. 5,852,434 and WO 00/73983, pressure sensors, as described in U.S. Pat. No. 6,104,388 or mechanical sensors, as described in U.S. Pat. No. 5,294,792 and U.S. Pat. No. 6,130,666. In still other types of electronic pens, triangulation of signals (e.g., light, sound, IR radiation) is used for position determination, such as described in U.S. Pat. No. 5,012,049.

Reading devices that are capable of reading information from surfaces and communicate the information in a communication network according to the present invention are described in WO 98/20446 and U.S. Pat. No. 6,058,304.

The foregoing description of an implementation of the invention has been presented for the purposes of illustration and description. It is not exhaustive and does not limit the invention to the precise form disclosed. Modifications and variations are possible in light of the above teachings or may be acquired from practicing the invention.

We claim:

1. A method for handling information in an information management system, said system including at least one digital pen capable of reading information and communicating at least part thereof in at least one communication network, wherein each at least one digital pen is associated with a respective pen identifier, the method including:
   associating an alias with a pen identifier in dependence on information that is registered on a product in the form of at least one position which is coded by a position code, said alias being indicative of a role of a pen user when the user communicates via a digital pen in the information management system.

2. A method according to claim 1, wherein the step of associating an alias includes associating one alias out of plurality of aliases with the pen identifier.

3. A method according to claim 1, wherein said alias corresponds to a role profile which is pre-stored in the information management system.

4. A method according to claim 1, including:
   associating a plurality of aliases with the pen identifier, each alias among said aliases being indicative of a different role of a pen user when the user communicates via the digital pen in the information management system.

5. A method according to claim 1, wherein said alias is a temporary alias used by a temporary user for communication in the information management system.

6. A method according to claim 1, including:
   associating a plurality of aliases with the pen identifier, each alias among said aliases being indicative of a role of different pen users when the users communicates via the digital pen in the information management system.

7. A method according to claim 1, including:
   associating a role profile with said alias, said role profile including data to be at least partly communicated with actors in the information management system.

8. A method according to claim 7, wherein the association of a role profile with said alias includes associating any of a name, an address, a telephone number, electronic mail address, or any other identification data with said alias.

9. A method according to claim 1, including:
   receiving user input, said input providing data for at least one alias association.

10. A method according to claim 9, wherein the reception of user input includes receiving data via the pen.

11. A method according to claim 9, wherein the reception of user input includes receiving data via an interface unit which is arranged for connection to a host unit providing a site on a public network.

12. A method according to claim 1, including:
    providing, on request from the user, data relating to at least the user alias.

13. A method according to claim 12, wherein the provision of data includes providing data to the user via the pen.

14. A method according to claim 12, wherein the provision of data includes providing data via an interface unit which is arranged for connection to a host unit providing a site on a public network.

15. A computer readable medium containing instructions, executed by a processor, for performing a method for handling information in an information management system, said system including at least one digital pen capable of reading information and communicating at least part thereof in at least one communication network, wherein each at least one digital pen is associated with a respective pen identifier, the method including:
    associating an alias with a pen identifier in dependence on information that is registered on a product in the form of at least one position which is coded by a position code, said alias being indicative of a role of a pen user when the user communicates via a digital pen in the information management system.

16. An information management system including at least one digital pen capable of recording information and communicating at least part thereof in at least one communication network, wherein each at least one digital pen is associated with a respective pen identifier, the system being arranged to:
    associate an alias with a pen identifier in dependence on information that is registered on said products in the form of at least one position which is coded by a position code, said alias being indicative of a role of a pen user when the user communicates via a digital pen in the information management system.

17. A system according to claim 16, the system being arranged to associate an alias by associating one alias out of a plurality of aliases with the pen identifier.

18. A system according to claim 16, wherein said alias corresponds to a role profile which is pre-stored in the information management system.

19. A system according to claim 16, the system being arranged to:
  associate a plurality of aliases with the pen identifier, each alias among said aliases being indicative of a different role of the pen user when the user communicates via the digital pen in the information management system.

20. A system according to claim 16, wherein said alias is a temporary alias used by a temporary user for communication in the information management system.

21. A system according to claim 16, the system being arranged to:
  associate a plurality of aliases with the pen identifier, each alias among said aliases being indicative of a role of different pen users when the users communicates via the digital pen in the information management system.

22. A system according to claim 16, the system being arranged to:
  associate a role profile with said alias, said role profile including data to be at least partly communicated with actors in the information management system.

23. A system according to claim 22, the system being arranged to associate a role profile with said alias, which includes associating any of a name, an address, a telephone number, electronic mail address, or any other identification data with said alias.

24. A system according to claim 16, the system being arranged to:
  receive user input, said input providing data for at least one alias association.

25. A system according to claim 24, the system being arranged to receive user
  input by way of receiving data via the pen.

26. A system according to claim 24, the system being arranged to receive user input by way of receiving data via an interface unit which is arranged for connection to a host unit providing a site on a public network.

27. A system according to claim 16, the system arranged to:
  provide, on request from a user, data relating to at least a user alias.

28. A system according to claim 27, the system being arranged to provide data to the user via the pen.

29. A system according to claim 27, the system being arranged to provide data via
  an interface unit which is arranged for connection to a host unit providing a site on a public network.

30. A system according to claim 16, comprising server means communicating with said at least one digital pen, said server means including a position database which associates positions coded by said position code with rules for information management, said server means further including an interface unit by means of which actors in said system are allowed to enter data into, and retrieve data from, the system.

31. A product for use in an information management system, which product is provided with information that is registered on the product in the form of at least one position which is coded by a position code, said system including at least one digital pen being capable of reading said information and communicating at least part thereof in at least one communication network, wherein each at least one digital pen is associated with a respective pen identifier, and wherein said information, when processed in the system, enables:
  association of an alias with a pen identifier in dependence on said information, said alias being indicative of a role of a pen user when the user communicates via a digital pen in the information management system.

32. A product according to claim 31, wherein the association of the alias includes association of one alias out of plurality of aliases with the pen identifier.

33. A product according to claim 31, wherein said alias corresponds to a role profile which is pre-stored in the information management system.

34. A product according to claim 31, including information which, when processed in the system, enables:
  association of a plurality of aliases with the pen identifier, each alias among said aliases being indicative of a different role of a pen user when the user communicates via the digital pen in the information management system.

35. A product according to claim 31, wherein said alias is a temporary alias used by a temporary user for communication in the information management system.

36. A product according to claim 31, including information which, when processed in the system, enables:
  association of a plurality of aliases with the pen identifier, each alias among said aliases being indicative of a role of different pen users when the users communicates via the digital pen in the information management system.

37. A product according to claim 31, including information which, when processed in the system, enables:
  association of a role profile with said alias, said role profile including data to be at least partly communicated with actors in the information management system.

38. A product according to claim 37, including information which, when processed in the system, enables:
  association of any of a name, an address, a telephone number, electronic mail address, or any other identification data with said alias.

39. A product according to claim 31, including information which, when processed in the system, enables:
  provision of data relating to at least a user alias.

40. A product according to claim 39, wherein the information enabling provision of data includes information enabling provision of data via the pen.

41. A product according to claim 39, wherein the information enabling provision of data includes information enabling provision of data via an interface unit which is arranged for connection to a host unit providing a site on a public network.

42. A method for handling information in an information management system, said system including at least one digital pen capable of reading information and communicating at least part thereof in at least one communication network, wherein each at least one digital pen is associated with a respective pen identifier, the method including:
  associating an alias with a pen identifier in dependence on information that is read from a product, said alias being indicative of a role of a pen user when the user communicates via a digital pen in the information management system.

* * * * *